(12) United States Patent
Gessner et al.

(10) Patent No.: US 9,367,708 B2
(45) Date of Patent: Jun. 14, 2016

(54) METHOD FOR PRODUCING A HARDWARE DEVICE AND HARDWARE DEVICE

(71) Applicant: Siemens Aktiengesellschaft, Munich (DE)

(72) Inventors: Jürgen Gessner, Forstinning (DE); Angela Schattleitner, Tuntenhausen (DE)

(73) Assignee: Siemens Aktiengesellschaft, Munich (DE)

( * ) Notice: Subject to any disclaimer, the term of this patent is extended or adjusted under 35 U.S.C. 154(b) by 37 days.

(21) Appl. No.: 14/358,765

(22) PCT Filed: Dec. 3, 2012

(86) PCT No.: PCT/EP2012/074207
§ 371 (c)(1),
(2) Date: May 16, 2014

(87) PCT Pub. No.: WO2013/098046
PCT Pub. Date: Jul. 4, 2013

(65) Prior Publication Data
US 2014/0328483 A1 Nov. 6, 2014

(30) Foreign Application Priority Data
Dec. 28, 2011 (EP) .................................. 11195875

(51) Int. Cl.
*G06F 21/87* (2013.01)
*G06F 21/71* (2013.01)
*H04L 9/32* (2006.01)

(52) U.S. Cl.
CPC ............... *G06F 21/87* (2013.01); *G06F 21/71* (2013.01); *H04L 9/3223* (2013.01); *H04L 9/3234* (2013.01)

(58) Field of Classification Search
CPC ....... G06F 21/87; G06F 21/71; H04L 9/3223; H04L 9/3234
USPC ............................................................ 380/29
See application file for complete search history.

(56) References Cited

U.S. PATENT DOCUMENTS 6,438,573 B1 *  8/2002 Nilsen ............................ 718/100
2002/0166112 A1 * 11/2002 Martin et al. ................. 717/124

FOREIGN PATENT DOCUMENTS

WO       WO 02071214 A1    9/2002

OTHER PUBLICATIONS

Mark Zwolinski; "SystemVerilog Synthesis" In: "Digital System Design with SystemVerilog", Prentice Hall; ISBN 978-0-13-704579-2; XP055022760; Oct. 23, 2009.

(Continued)

*Primary Examiner* — Baotran N To
(74) *Attorney, Agent, or Firm* — Cozen O'Connor

(57) ABSTRACT

A method for producing a hardware device, in particular a trusted platform module for the execution of at least one cryptographic algorithm, the hardware device corresponding to a real-time class, i.e., it fulfils specifiable run-time requirements for real-time applications, wherein the method comprises preparing at least one cryptographic algorithm in the manner of a program code; determining a maximum/longest execution time (WCET) for the algorithm, producing a tamper-proof hardware module, which is configured to execute the algorithm, and assigning the hardware module to a real-time class depending on the maximum/longest execution time (WCET).

16 Claims, 3 Drawing Sheets

(56) References Cited

OTHER PUBLICATIONS

Scott Hauck et al: "Introduction ; Algorithmic Complexity"; Reconfigurable Computing: The Theory and Practice of FPGA-Based Computation, Morgan Kaufmann; ISBN: 978-0-08-055601-7; XP055022885; Nov. 11, 2007.

Wilhelm R et al: "The worst-case execution-time problem? Overview of methods and survey of tools"; ACM Transactions on Embedded Computing Systems, ACM, New York, NY; vol. 7; No. 3; pp. 36-53; ISSN: 1539-9087; DOI: 10.1145/1347375.1347389; XP002502848; Apr. 1, 2008.

Huang C H et al: "UML-based hardware/software co-design platform for dynamically partially reconfigurable network security systems", Journal of Systems Architecture, Elsevier SV; vol. 56; No. 2-3; pp. 88-102; ISSN: 1383-7621; DOI: 10.1016/J.SYSARC.2009.11.007; XP026944461; Feb. 1, 2010.

\* cited by examiner

1

METHOD FOR PRODUCING A HARDWARE DEVICE AND HARDWARE DEVICE

CROSS-REFERENCE TO RELATED APPLICATIONS

This is a U.S. national stage of application No. PCT/EP2012/074207 filed 3 Dec. 2012. Priority is claimed on European Application No. 11195875 filed 28 Dec. 2011, the content of which is incorporated herein by reference in its entirety.

BACKGROUND OF THE INVENTION

1. Field of the Invention

The present invention relates to a hardware device and a method for producing the hardware device, such as a manipulation-proof hardware chip in the style of a trusted platform module.

2. Description of the Related Art

A trusted platform module (TPM) is understood to mean a chip that is fabricated in accordance with prescribed specifications from the trusted computing group (TCG). In this case, the TCG provides open standards for trusted computing platforms, a trusted platform being understood to mean a chip or a computer platform that reliably behaves in a predefined manner for the prescribed purpose.

In this case, a corresponding piece of TPM hardware implements security functions as an integrated circuit or chip and can be used in various devices, such as PCs, notebooks, PDAs, mobile telephones or network devices in networks. In this case, a TPM comprises an explicit cryptographic key that can be used to identify the computer in which the TPM is used. In standard applications, such as for personal computers that are equipped with TPM modules, the computation speed of the TPM is usually insignificant. Cryptographic coprocessors in industrial applications also usually have no realtime capability.

However, it is desirable, in areas with realtime requirements, such as automation engineering, also to provide reliable realtime-compatible modules that implement cryptographic applications, in particular. In this case, it has been particularly difficult in the past to specify such hardware devices reliably.

SUMMARY OF THE INVENTION

It is therefore an object of the present invention to provide an improved method for producing a corresponding hardware device.

This and other objects and advantages are achieved in accordance with the invention by providing a method for producing a hardware device, particularly a trusted platform module, for executing at least one, in particular cryptographic, algorithm. In this case, the hardware device preferably has realtime capability and corresponds to a realtime class, for example, and the method comprises providing at least one algorithm in the form of program code, determining a maximum or longest execution time for the algorithm, fabricating a tamper-proof hardware device that is set up to execute the algorithm, and allocating the hardware device to a realtime class based on the maximum execution time.

The hardware device, which can also be referred to as a chip, IC circuit or hardware chip, preferably comprises a trusted platform module in this case. The TPM module is embodied in accordance with the TCG specifications in this case. However, it is also possible for the hardware device to be organized in accordance with different or similar specifications. The respective maximum or longest execution time for the algorithm, which may be available in a program code such as C or in other programming languages, for example, is indicated in clock cycles or else in the number of floating point operations that are necessary for performing the algorithm.

The allocation to a realtime class, e.g., according to the classification of the IAONA or according to IEC-61784-2, ensures that the hardware device always performs the algorithm within the maximum execution time for the implemented algorithm. Hence, realtime applications are possible. As a result, the hardware device is particularly suitable for use in process automations or industrial automation systems.

Suitable algorithms for the hardware device are encryption or authentication functions and secure cryptographic key storage operations, for example. When the algorithm is selected or organized in the form of program codes, all the possible execution paths that can arise during the handling of the algorithm are preferably detected and recorded. The execution paths can be calculated, established or determined. The algorithm, which implements particularly a cryptographic function, can be customized for the possible execution paths, i.e., program passes, in the actual design phase, for example in the form of UML modeling operations using clocks or timers.

The method preferably also comprises the detection, calculation, establishment or determination of the execution times or the calculation times for all the execution paths for the algorithm. Comparison of the execution times, for example, measured from the necessary clock cycles, allows the maximum required time for performing the algorithm to be determined. This maximum or longest execution time is used for classifying the hardware chip or the hardware device that is produced with tamper-proofing.

In this case, the hardware chip can be implemented as an FPGA or ASIC, for example. In this respect, a realtime-compatible hardware device with cryptographic functions is obtained that is suitable particularly for use in automation networks. A user of the relevant hardware knows reliably how quickly he can expect a response from the module to a request, for example.

In one embodiment, the method may also comprise: prescription of a maximum data length for an input parameter, with the algorithm being executed based on the input parameter. Examples of input parameters are cryptographic keys, which have their length prescribed in bits or bytes. This allows a standardized and limited maximum execution time to be attained in the design and production phase for the hardware device. The maximum execution time is also referred to as WCET (worst case execution time).

The method preferably comprises: compilation of the program code using a nonoptimizing compiler. By way of example, a WCET-optimizing compiler is used, rather than, as otherwise customary, ACET/OCET-optimizing compilers (ACET=average case execution time, OCET=optimal case execution time). The compiled program code is then implemented in hardware, as a result of which the program logic is available as hardware. In order to confirm or verify the maximum or longest execution time for the algorithm, it is possible to use a WCET analysis tool. WCET is understood to mean the worst case execution time.

The method for producing a hardware device can be extended such that a series of hardware chips is produced, and each hardware chip is allocated to a realtime class. By way of example, hardware chips having prescribable realtime specifications can be produced that can be used for a prescribed application environment. In the case of hardware chips allocated to a realtime class, the algorithm is executed within the maximum execution time, which is reliably indicated to the user of the hardware device by the realtime classification.

By way of example, it is possible for the hardware chips in a respective series to execute a prescribed algorithm and for the hardware chips in different series to execute different algorithms. By way of example, in this case it is possible to implement algorithms that implement a method for hash value calculation, such as SHA-1, SHA-256, symmetric encryption methods, such as DES, 2DES, ABS. asymmetric encryption methods, such as RSA, ECDSA, or a method for generating a random number.

In addition, a trusted platform module is proposed that is produced according to a method as described above. The trusted platform module can be used in a computer device, such as a PC, or in devices of an automation system.

Furthermore, a computer program product is proposed that prompts the performance of the method as explained above for producing a hardware device at least to some extent on one or more program-controlled devices.

A computer program product such as a computer program means can be provided or supplied as storage medium, such as a memory card, USB stick, CD-ROM, DVD, or else in the form of a downloadable file, by a server in a network, for example. This can be effected in a wireless communication network, for example, by the transmission of an appropriate file with the computer program product or the computer program means. A suitable program-controlled device is particularly a program-controlled design system for integrated circuits.

Further possible implementations of the invention also comprise combinations that are not explicitly cited for features or embodiments of the method or of a hardware device that are described above or below for the exemplary embodiments. In this case, a person skilled in the art will also add or modify single aspects as improvements or additions to the respective basic form of the invention.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The properties, features and advantages of this invention that are described above and also the manner in which these are achieved will become clearer and more distinctly comprehensible in connection with the description below of the exemplary embodiments, which are explained in more detail in connection with the drawings, in which.

DETAILED DESCRIPTION OF THE PREFERRED EMBODIMENTS

In the figures, elements that are the same or have the same function have been provided with the same reference symbols, unless stated otherwise.

Realtime-compatible hardware devices that are set up in the style of trusted platform modules provide cryptographic functions for access control, for encryption/decryption and for authentication in real time. A suitable realtime application is, in particular, an automation system, where automation devices are equipped with appropriate TPMs and communicate with one another via expansively ramified communication networks, in particular open networks. In this case, it is particularly desirable for the TPM to be provided as a realtime application.

Figure 1:
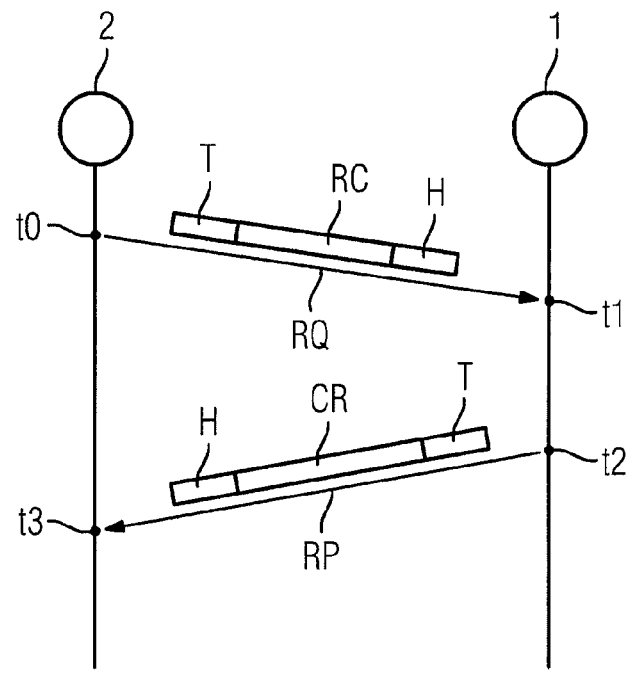
FIG. 1 shows a schematic illustration of realtime communication with a first embodiment of a hardware device.

In a standard challenge/response arrangement, a master device 2 sends a request message RQ to the TP module or the tamper-proof hardware device 1, as shown schematically in FIG. 1. This occurs at the time t0. In this case, the hardware device 1 is produced using a method as described below. The TP module 1 is designed particularly according to TCG specifications in this case. That is, an endorsement key is explicitly allocated, the private portion of the key being stored in the TPM and not being readable. A storage route key is stored, as well as an attestation identity key. In addition, a secure random number generator is implemented in the trusted platform module 1. Furthermore, security functions, such as sealing, relocation, protection of cryptographic keys, certification by attestation methods, such as privacy CA or direct anonymous attestation may be existent.

A prevalent algorithm that may be available in the form of a computer program or program code is the calculation of a hash value, such as HMAC-SHA1. This is indicated by way of example in FIG. 1. At the time t0, the master device 2 sends a request message RQ (Request) via a suitable communication network, which may be the Internet, for example, or else wireless network connections based on a known protocol to the hardware device 1, which is embodied as a trusted platform module. In this case, the transmitted data comprise a header H, a trailer T and random request data, which are also referred to as random challenge RC. The request RQ is detected by the TPM at the time t1.

For this random challenge RC, the hardware device 1 calculates a challenge response CR=HMAC-SHA1 (RC, SS). This involves the use of a shared password or shared secret SS.

Following the calculation at the time t2, the TPM 1 sends a request response or challenge response CR. Again, the transmitted data comprise a header H and a trailer T. At the time t3, the master device 2 receives the response message CR.

The timing is shown in FIG. 1 in an orientation from top to bottom. Particularly in the case of the transmission in open networks, such as the Internet, realtime calculation, i.e., delivery of the challenge response CR within a prescribed time, is necessary. The trusted platform module 1 shown is implemented as a realtime-compatible trusted platform module. That is, the handling time or execution time for the algorithm that performs the crypto function, for example, the calculation of the hash, is prescribed deterministically and by the hardware. In the example shown, the longest or maximal execution time for producing the response CR is t2−t1. It is also possible to refer to the WCET=t2−t1.

In order to meet the realtime requirement, allowance is made for the trusted platform module during the design and modeling, for example, by unified modeling language (UML), and the production of the trusted platform module, as explained in more detail below. The trusted platform module 1 is therefore provided with a specification that demonstrates the realtime capability of the TPM, and it can therefore be allocated to a realtime class. It is also possible to refer to the trusted platform module 1 produced providing a particular quality of service (QoS) and therefore being able to be used in an environment that presupposes hardware and software with realtime capability.

An advantage of realtime-compatible trusted platform modules or cryptographic modules or hardware chips is that they can be used particularly beneficially in automation engineering. The realtime requirements of the TPM that are met mean that the latter are able to replace currently standard physical security mechanisms between the components used, which means that the use of these realtime-compatible trusted platform modules is advantageous particularly in open networks.

Realtime requirement is subsequently understood to mean that a deterministic execution time for a prescribed algorithm, such as a cryptographic algorithm, occurs in a prescribed context. Under all circumstances, the prescribed maximum execution time, such as the delivery of a challenge response, is ensured, as indicated in FIG. 1. Usually, realtime applications are also understood to mean calculations that occur particularly quickly, i.e., with a good level of performance. The indication of a realtime class for the trusted platform module allows the respective application environments to safely use the deterministic calculation of algorithms for making calculations.

Figure 2:
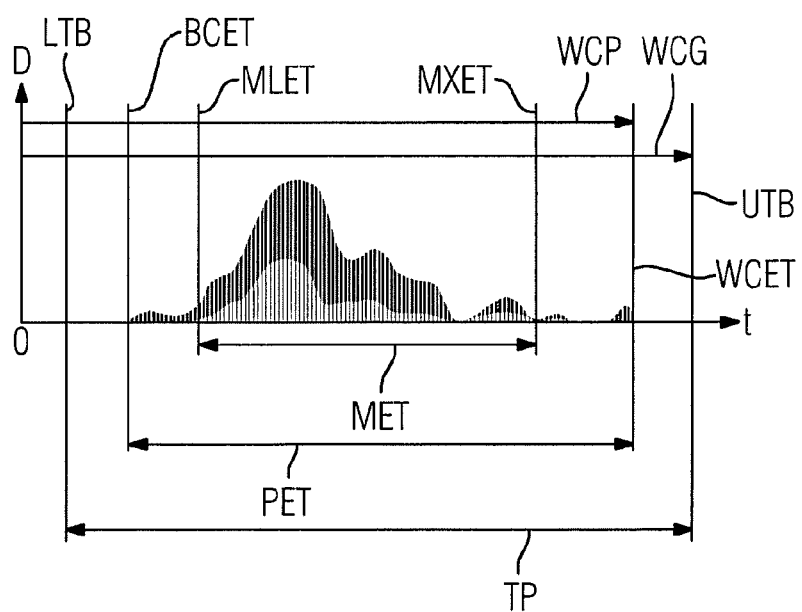
FIG. 2 shows a schematic illustration of an execution time distribution for an algorithm for implementation in a hardware device.

In order to explain execution time distributions for algorithms, an execution time distribution D is plotted over time by way of example in FIG. 2. Usually, an algorithm is calculated or executed based on an input parameter. In this respect, a different execution time may arise for various passes of the algorithm or of the handling by a piece of hardware. In this case, FIG. 2 shows a distribution of execution times for an algorithm that is not specified in more detail between a lower timing bound LTB and an upper timing bound UTB. By way of example, this may be the provision of a random number, a crypto algorithm, hash algorithm or other calculations that are necessary in trusted platform modules.

The distribution is irregularly scattered between LTB and UTB. The possible execution times are situated between BCET, a best case execution time, which is relatively short, and the worst case execution time WCET. The possible execution times are denoted by PET. In addition, a minimum measured execution time MLET and a maximum measured execution time MXET are indicated.

The indication and classification of a trusted platform module into a realtime class require the maximum or longest execution time WCET to be determined for the implemented hardware that maps the program logic of the algorithm. The influencing factors for the WCET are the program logic and the conversion to an appropriate machine code. Furthermore, the WCET is dependent on the architecture and clock frequency of the hardware used, and also the size or length of the input data is a factor that influences the WCET.

The algorithm to be implemented in the trusted platform module is presented in the style of program flowcharts according to DIN 66001 or other control flow graphs using UML, for example. Program flowcharts can be used to specify execution paths within the programs that have different lengths. In particular, symmetric and asymmetric cryptography algorithms, hash algorithms and random number generators are considered below. These are usually implemented in trusted platform modules.

In particular, ASICs or FPGAs are suitable as hardware implementation. An application-specific integrated circuit (ASIC) is realized as an integrated circuit, with operation now being practically unmanipulable. In this case, ASICs can be equipped with memories, microprocessors and the like as a system on a chip (SoC).

Field programmable gate arrays (FPGAs) can likewise be used to realize tamper-proof hardware devices such as trusted platform modules.

During the production of the trusted platform module, the size or data length of the input data is now stipulated to obtain a deterministic calculation time or to obtain a WCET. By way of example, data based on the Profinet standard in the form of a datagram (as indicated in FIG. 1) can be used. The volume of data in a Profinet datagram, such as with a header and a trailer and also respective data, can therefore be stipulated from the outset. As a result, it is possible for the execution time for all the paths in the program code to be detected during the program flow. In this case, it is also possible to detect error situations. As a result, the maximum execution time is determined to be the longest of all the possible path execution times. It is also possible to refer to static analysis of the program execution.

The maximum execution time is then determined from the number of necessary clock cycles for the longest execution path, for example. Alternatively or in addition, it is also possible to use methods such as Parse-tree-based methods or execution time modeling operations.

Particularly in the case of the processing of cryptographic keys or initialization data as input parameters for the algorithm, the data length, such as in the number of bytes or bits, is firmly prescribed, as a result of which it is possible to reliably determine a maximum execution time.

Figure 3:
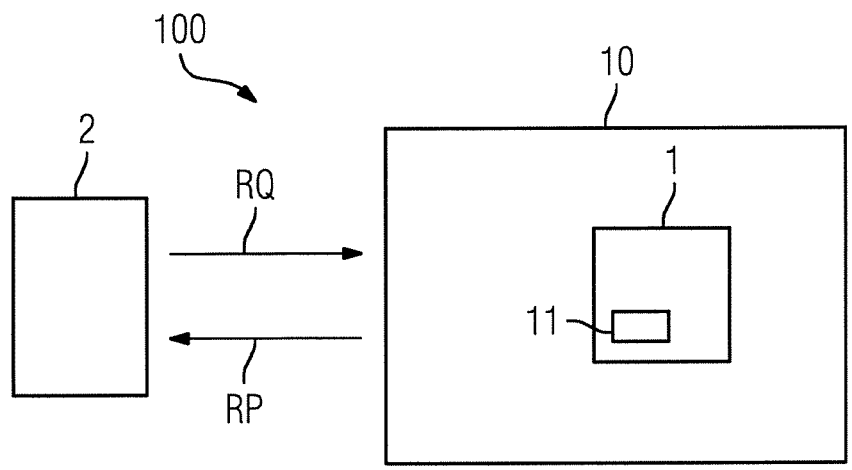
FIG. 3 shows a schematic illustration of an embodiment of a challenge/response arrangement with a trusted platform module as hardware device.

FIG. 3 shows a schematic illustration of an embodiment of a challenge/response arrangement 100 with a trusted platform module 1 as hardware device.

Figure 4:
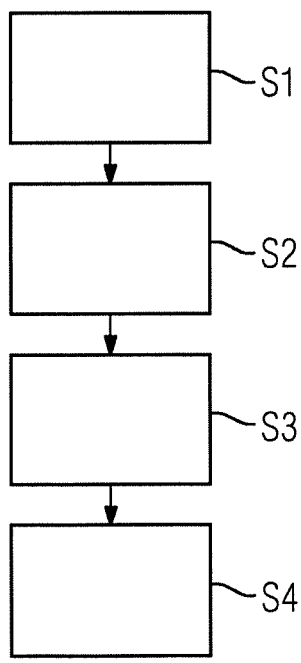
FIG. 4 shows a schematic flowchart to explain an embodiment of a method for producing a hardware device.
Figure 5:
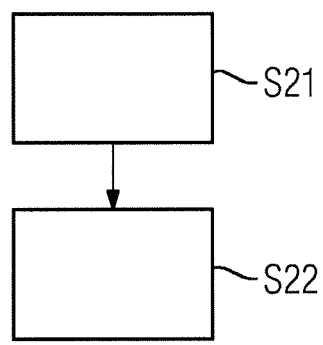
FIG. 5 shows a portion of a schematic flowchart to explain a further embodiment of a method for producing a hardware device.
Figure 6:
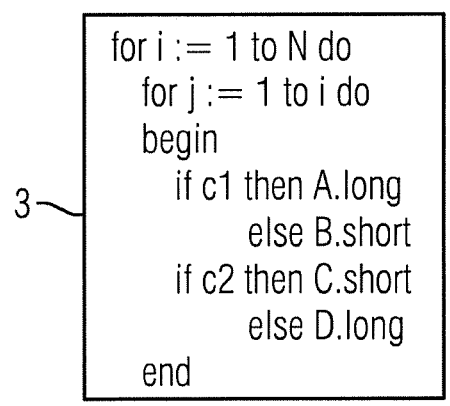
FIG. 6 shows a schematic illustration of a portion of a program code to explain execution path determination.

FIGS. 4, 5 and 6 show embodiments and portions of a flowchart to explain a production method for the trusted platform module 1. The aim of the production method is particularly, as already indicated in FIG. 1, to provide a computer device, such as an automation device 10, that is equipped with a trusted platform module 1 that has realtime capability. In this case, the trusted platform module 1 comprises a memory 11 for cryptographic keys of prescribed length. A master device 2 sends a request RQ and, following deterministic calculation of the response RP by the trusted platform module 1, receives a response. This makes it possible to ensure that the automation device 10 is part of the associated automation network, for example, and proves its identity to the master device 2 in good time.

In order to produce the trusted platform module 1 in a reliable manner, a first step S1 of the production method involves at least one algorithm, such as an algorithm for calculating a hash value or a random number generator or a symmetric or asymmetric encryption algorithm, being indicated. The algorithm is provided as program execution code. By way of example, FIG. 6 indicates a portion of an exemplary algorithm 3. It is also possible to produce hardware devices that realize a plurality of algorithms. Step S1 gives consideration to the case in which only one exemplary algorithm 3 is provided.

In the subsequent step S2, the maximum or longest execution time for the algorithm 3 is determined. Factors that may be cited that influence the longest or maximum execution time for the prescribed algorithm 3 are, in particular, prescribed input parameters, such as crypto parameters, key length, algorithm and the like. The parameters that are output by the algorithm and also prescribed reactions from the algorithm in the event of an error are also stipulated. By way of example, access to the cryptographic key in the memory 11 of the trusted platform module 1 also involves concomitant determination of the access time by the loading software or function used. The type of memory and the length of the key can therefore be indicated deterministically, as a result of which it is possible for the longest or maximum execution time WCET to be determined on the basis of these factors.

In addition, as indicated in FIG. 5, a step S21 involves detection of all the possible execution paths for the algorithm being performed. This means that an algorithm that is presented as program code or UML, for example, is analyzed such that all the possible execution paths are known. Next, all the possible execution times for the detected execution paths for the algorithm 3 are measured or calculated in step S22. The execution time is indicated in a number of floating point calculations or else clock cycles, for example.

Using the example of the algorithm that is shown in FIG. 6, possible loop passes are started in an outer loop N, for example, and N passes are likewise started in the inner loop, which is dependent on the sequential parameter J. Overall, (N+1)N/2 executions arise in the program section between "begin" and "end". In the case of more complex algorithms, for example, for calculating hash values or symmetric or asymmetric crypto algorithms such as DES, AES, RSA or ECDSA, a similar number of execution paths that can be considered in each case is obtained. The result obtained is a maximum execution time WCET for the algorithm to be implemented, said execution time corresponding to the longest execution path.

Next, the algorithm is implemented as a tamper-proof hardware device. This means particularly a trusted platform module, such as a chip and an ASIC. Particularly a trusted platform module that is implemented as an ASIC cannot be changed again following fabrication. In this respect, the deterministic maximum execution time WCET is stipulated by the production process in method steps S1 to S3. Next, the manufacturer can specify a range for the respective clock frequency, depending on the technology used. On the basis of the clock frequency for the trusted platform module as an ASIC, it is possible to indicate the maximum execution time WCET in milliseconds or nanoseconds, for example. In this respect, the manufacturer is able to classify the trusted platform module produced into a realtime class. This is done in step S4 based on the deterministic maximum execution time for the algorithm implemented in the trusted platform module, as defined by method steps S1 to S3.

In this case, it is possible to produce different types of trusted platform modules suitable for different realtime requirements. During operation with the user, a trusted platform module is then chosen from a prescribed realtime class that complies with the area of application. If a trusted platform module is used in a sensor network, for example, with the sensors delivering sensor signals to a monitoring device only rarely, it is sufficient to use slow trusted platform modules in a realtime class that corresponds to a comparatively high WCET, for example.

It is also possible to implement the hardware chip or the trusted platform module 1 as a semi-programmable FPGA. By way of example, in that case an FPGA as a TPM can be customized further by the user in respect of the realtime requirements. By way of example, the cryptographic functions, clock frequencies, the input and output width or the internal memory 11 used can be stipulated. Nevertheless, it is possible to stipulate a deterministic maximum execution time via the classification during production into realtime classes.

In addition or as an alternative to the proposed measures for deterministically stipulating a realtime requirement for a trusted platform module, an initial key may be stipulated as what is known as a trust anchor on the trusted platform module itself with access protection. The cryptographic keys derived therefrom can then be stored permanently or in a volatile manner on other storage media in the appliance into which a trusted platform module is inserted. This means that not all the necessary cryptographic keys need to be stored within the TPM. For decrypting the data compiled outside, the TPM is then also used for determining the WCET.

Particularly the calculation of symmetric algorithms is always the same regardless of the input data and the keys, which means that there is a good deterministic and reproducible calculation period or execution time for the respective algorithm. As a configuration parameter for a symmetric algorithm, this may match the respective application requirement. By way of example, the time or execution time for calculating input blocks, including the times required for input and output and also the key handling within the trusted platform module, can be indicated as a number of clock cycles. The resultant response time, such as for an input block, is then dependent on the clock frequency, which can likewise be indicated as a specification of the trusted platform module.

Hardware implementations of hash algorithms also allow indication of the required execution time or of the maximum necessary execution time based on clock cycles. This applies because the time for hashing an input block is independent of the data content. Hence, the necessary execution time for hashing data increases only linearly with the number of input blocks. For typical volumes of data in an application environment of the trusted platform module, it is therefore possible to indicate the realtime response time. By way of example, a corresponding realtime-compatible trusted platform module can be used in Profinet environments, flash memories, firmwares, etc.

When implementing asymmetric algorithms, the necessary execution time may also be dependent on the input data, depending on the actual hardware implementation. In the case of asymmetric algorithms, such as RSA or ECDSA, it is possible to estimate a maximum number of clock cycles by analyzing the underlying algorithm and the execution paths therefor. This also requires the indication of a maximum time, i.e., a maximum execution time for the algorithm.

In the case of random number generators, it is possible to use a deterministic algorithm that can be analyzed in terms of the execution paths therefor. Hardware support by radioactive or physical noise waves is also conceivable.

Overall, the realtime-compatible tamper-proof hardware device in the form of a trusted platform module provides a simple way of using realtime-compatible trusted platform modules in open networks, which reduces or supersedes the otherwise necessary physical security measures of networked security-relevant devices. In particular, application in the automation environment, such as in the equipment of networked automation devices with appropriate realtime-compatible trusted platform modules, is possible.

Although the invention has been illustrated and described in more detail by means of the preferred exemplary embodiment, the invention is not restricted by the disclosed examples, and other variations can be derived therefrom by a person skilled in the art without departing from the scope of protection of the invention.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for producing a hardware device for executing at least one algorithm, wherein the hardware device corresponds to a realtime class, comprising:
    providing at least one algorithm in the style of a program code, the at least one algorithm having a prescribed maximum data length for an input parameter and being executed based on the at least one input parameter;
    determining a maximum execution time for the algorithm;
    fabricating a tamper-proof hardware device configured to execute the algorithm; and
    allocating the hardware device to a realtime class based on the determined maximum execution time.

2. The method as claimed in claim 1, further comprising: detecting all possible execution paths for the algorithm.

3. The method as claimed in claim 1, further comprising: detecting execution times for all execution paths for the algorithm.

4. The method as claimed in claim 2, further comprising: detecting execution times for all the possible execution paths for the algorithm.

5. The method as claimed in claim 1, wherein a cryptographic initial key having a prescribed data length is stipulated as a standard input parameter.

6. The method as claimed in claim 1, further comprising: compiling the program code via a nonoptimizing compiler.

7. The method as claimed in claim 1, further comprising: confirming the maximum execution time with a maximum execution time analysis tool.

8. The method as claimed in claim 1, wherein the execution time is determined as a number of required clock cycles or floating point operations.

9. The method as claimed in claim 1, wherein the hardware device is fabricated as a field programmable gate array or an application specific integrated circuit.

10. The method as claimed in claim 1, wherein hardware devices allocated to a realtime class execute the algorithm within the maximum execution time.

11. The method as claimed in claim 1, wherein a series of hardware devices is produced and each hardware device is allocated to a realtime class.

12. The method as claimed in claim 11, wherein the hardware devices in a respective series execute a prescribed algorithm and the hardware devices in different series execute different algorithms.

13. The method as claimed in claim 1, wherein the algorithm implements one of (i) a method for hash value calculation, (ii) a symmetric encryption method, (iii) an asymmetric encryption method and (iv) a method for generating a random number.

14. The method as claimed in claim 13, wherein the method for the hash value calculation comprises SHA-1, SHA-256, the symmetric encryption method comprises DES, 2DES, AES, and the asymmetric encryption method comprises RSA, ECDSA.

15. The method as claimed in claim 1, wherein the hardware device comprises a trusted platform module.

16. The method as claimed in claim 1, wherein the hardware device is included in a computer device.

* * * * *